United States Patent
Grassi

[19]

[11] Patent Number: 6,135,361
[45] Date of Patent: Oct. 24, 2000

[54] GARDEN SPRAYER

[76] Inventor: Aron J. Grassi, 5473 W. Belmont, Fresno, Calif. 93722

[21] Appl. No.: 09/339,801

[22] Filed: Jun. 24, 1999

[51] Int. Cl.⁷ .................................................. A01G 25/09
[52] U.S. Cl. .......................... 239/172; 239/302; 239/373; 239/530
[58] Field of Search .................................. 239/146, 147, 239/195, 198, 172, 281, 302, 332, 333, 337, 373, 375, 525, 530, 532; 222/529, 333, 383.3, 383.1, 608, 626; 220/562, 564

[56] References Cited

U.S. PATENT DOCUMENTS

| | | | |
|---|---|---|---|
| 3,837,539 | 9/1974 | Schlegel | 222/626 |
| 4,089,446 | 5/1978 | Logan, II et al. | 239/172 |
| 4,135,669 | 1/1979 | Bridges et al. | 239/146 |
| 4,865,255 | 9/1989 | Luvisotto | 239/302 |
| 5,695,121 | 12/1997 | Stillions, Jr. et al. | 239/172 |
| 5,752,661 | 5/1998 | Lewis | 239/332 |
| 5,810,213 | 9/1998 | Flores et al. | 239/373 |

*Primary Examiner*—Andres Kashnikow
*Assistant Examiner*—Lisa Ann Douglas

[57] ABSTRACT

A garden sprayer for spraying liquids such as pesticides, fertilizers, and herbicides. The garden sprayer includes a housing defining a reservoir therein for holding fluid therein. The housing also has a lower compartment beneath the reservoir of the housing. A tubular flexible elongate conduit is outwardly extended from the housing. A pump is disposed in the lower compartment of the housing and is in fluid communication with the reservoir of the housing and the elongate conduit. The pump pumps fluid from the reservoir to the elongate conduit when actuated. A spray nozzle is coupled to a free outer end of the elongate conduit. The spray nozzle has a trigger pivotally coupled thereto. The trigger has a switch for selectively actuating the pump.

10 Claims, 3 Drawing Sheets

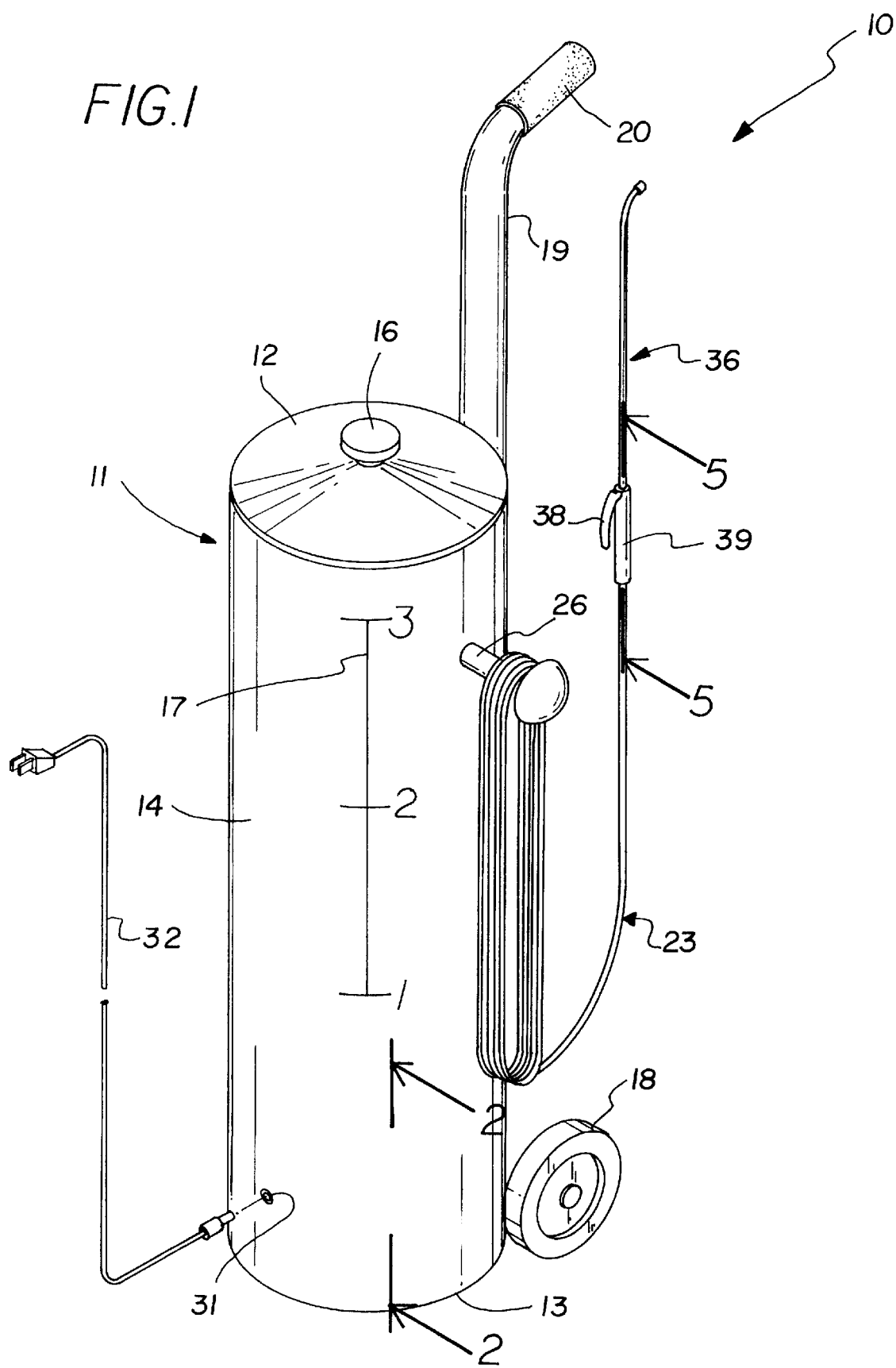

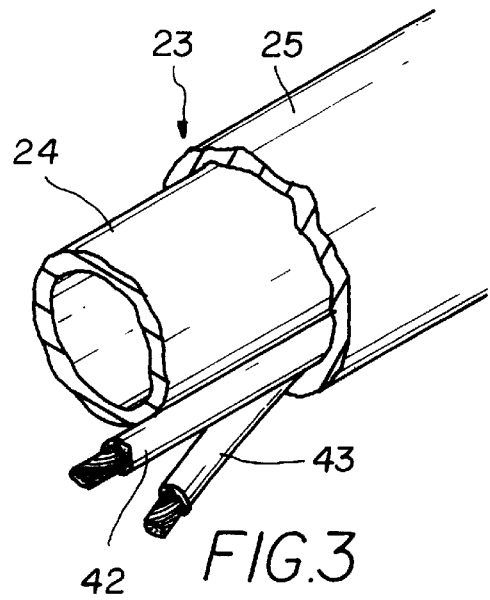
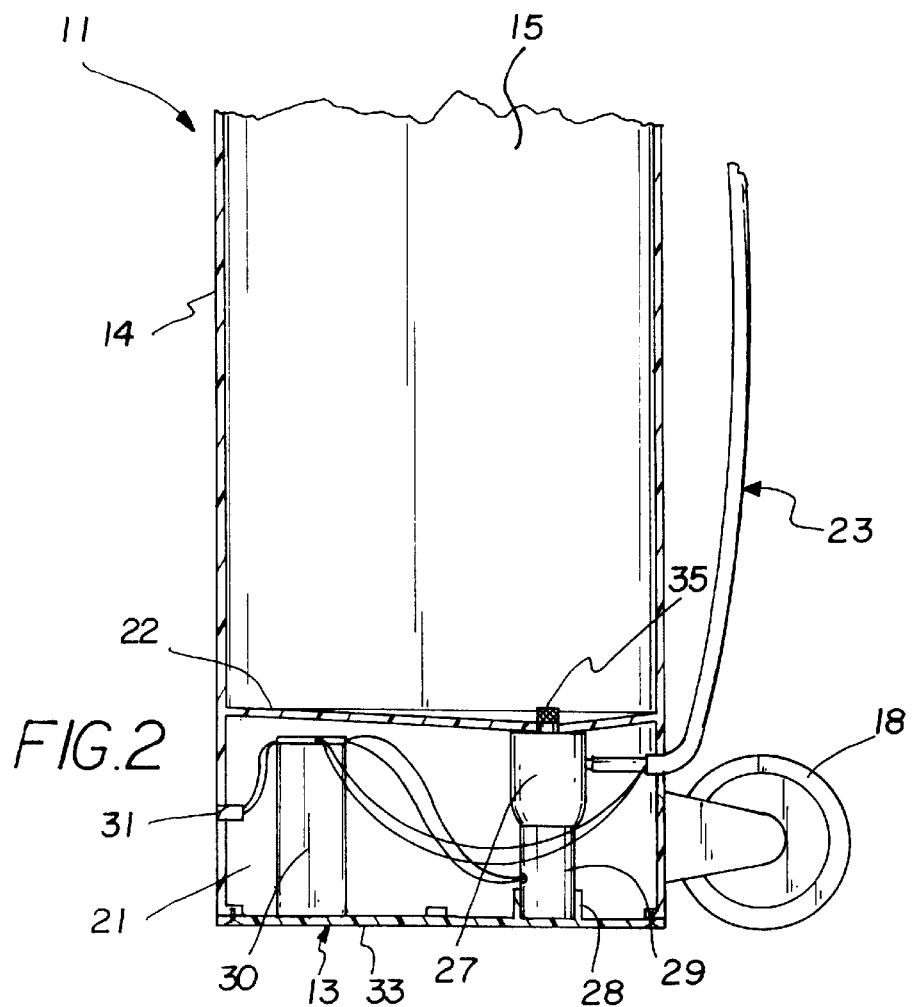

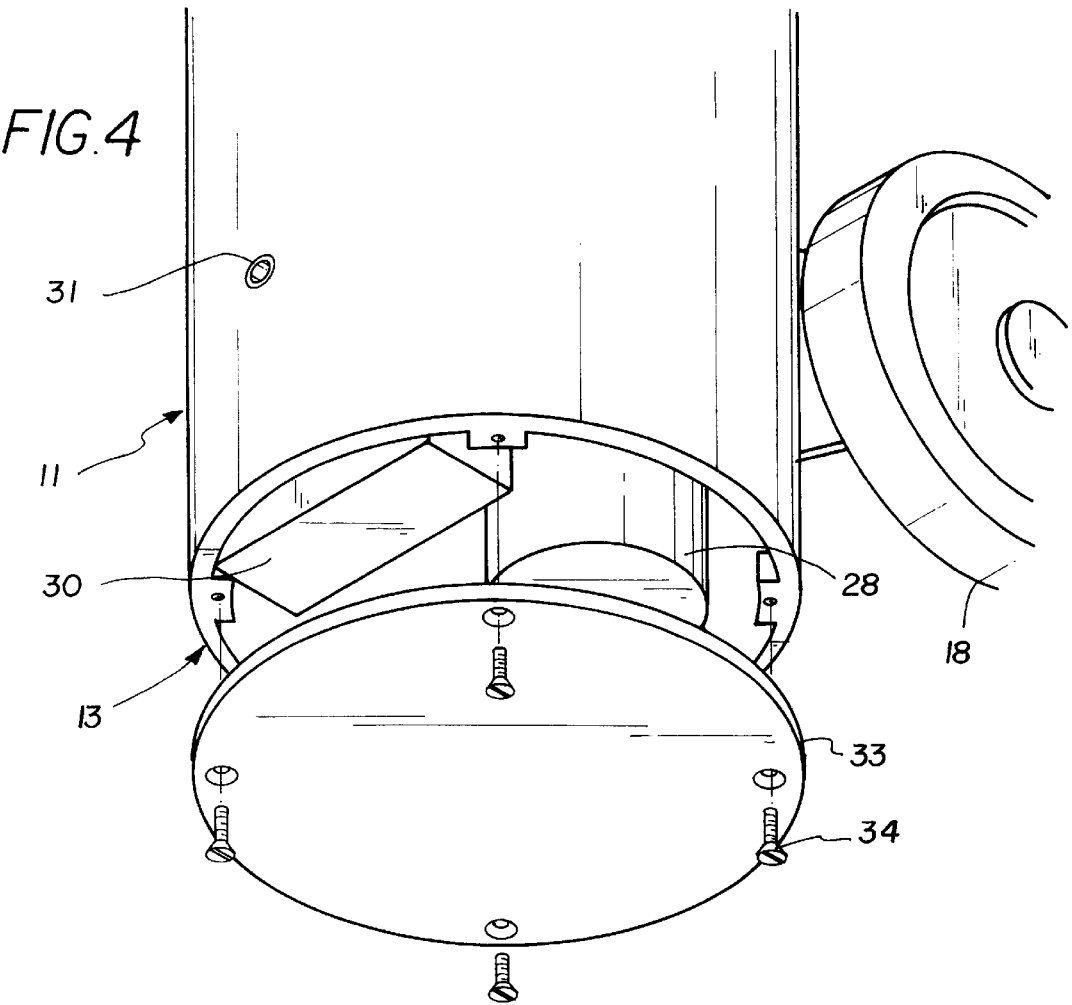
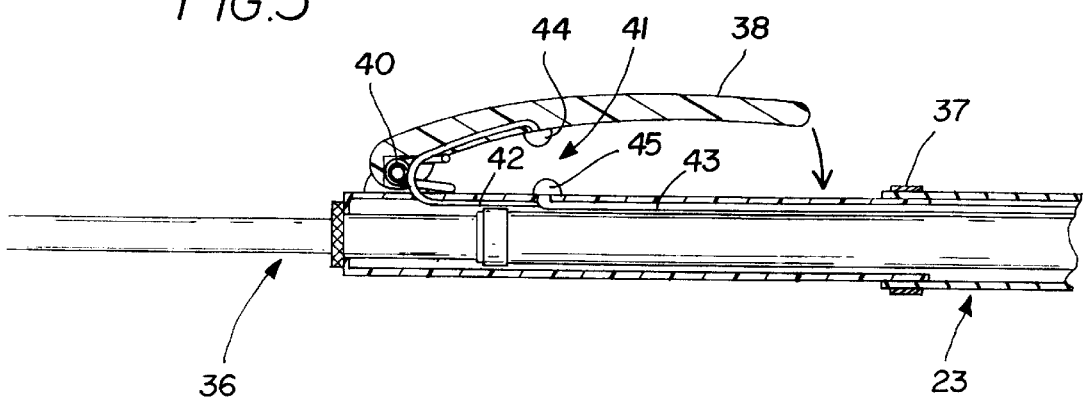

GARDEN SPRAYER

BACKGROUND OF THE INVENTION

1. Field of the Invention

The present invention relates to garden sprayers and more particularly pertains to a new garden sprayer for spraying liquids such as pesticides, fertilizers, and herbicides.

2. Description of the Prior Art

The use of garden sprayers is known in the prior art. More specifically, garden sprayers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,925,105; U.S. Pat. No. 4,801,088; U.S. Pat. No. 4,621,770; U.S. Pat. No. 3,915,351; U.S. Pat. No. 3,901,449; and U.S. Pat. No. Des. 286,906.

While these devices fulfill their respective, particular objectives and requirements. the aforementioned patents do not disclose a new garden sprayer. The inventive device includes a housing defining a reservoir therein for holding fluid therein. The housing also has a lower compartment beneath the reservoir of the housing. A tubular flexible elongate conduit is outwardly extended from the housing. A pump is disposed in the lower compartment of the housing and is in fluid communication with the reservoir of the housing and the elongate conduit. The pump pumps fluid from the reservoir to the elongate conduit when actuated. A spray nozzle is coupled to a free outer end of the elongate conduit. The spray nozzle has a trigger pivotally coupled thereto. The trigger has a switch for selectively actuating the pump.

In these respects, the garden sprayer according to the present invention substantially departs from the conventional concepts and designs of the prior art, and in so doing provides an apparatus primarily developed for the purpose of spraying liquids such as pesticides, fertilizers, and herbicides.

SUMMARY OF THE INVENTION

In view of the foregoing disadvantages inherent in the known types of garden sprayers now present in the prior art, the present invention provides a new garden sprayer construction wherein the same can be utilized for spraying liquids such as pesticides, fertilizers, and herbicides.

The general purpose of the present invention, which will be described subsequently in greater detail, is to provide a new garden sprayer apparatus and method which has many of the advantages of the garden sprayers mentioned heretofore and many novel features that result in a new garden sprayer which is not anticipated, rendered obvious, suggested, or even implied by any of the prior art garden sprayers, either alone or in any combination thereof.

To attain this, the present invention generally comprises a housing defining a reservoir therein for holding fluid therein. The housing also has a lower compartment beneath the reservoir of the housing. A tubular flexible elongate conduit is outwardly extended from the housing. A pump is disposed in the lower compartment of the housing and is in fluid communication with the reservoir of the housing and the elongate conduit. The pump pumps fluid from the reservoir to the elongate conduit when actuated. A spray nozzle is coupled to a free outer end of the elongate conduit. The spray nozzle has a trigger pivotally coupled thereto. The trigger has a switch for selectively actuating the pump.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new garden sprayer apparatus and method which has many of the advantages of the garden sprayers mentioned heretofore and many novel features that result in a new garden sprayer which is not anticipated, rendered obvious, suggested, or even implied by any of the prior art garden sprayers, either alone or in any combination thereof.

It is another object of the present invention to provide a new garden sprayer which may be easily and efficiently manufactured and marketed.

It is a further object of the present invention to provide a new garden sprayer which is of a durable and reliable construction.

An even further object of the present invention is to provide a new garden sprayer which is susceptible of a low cost of manufacture with regard to both materials and labor, and which accordingly is then susceptible of low prices of sale to the consuming public, thereby making such garden sprayer economically available to the buying public.

Still yet another object of the present invention is to provide a new garden sprayer which provides in the apparatuses and methods of the prior art some of the advantages thereof, while simultaneously overcoming some of the disadvantages normally associated therewith.

Still another object of the present invention is to provide a new garden sprayer for spraying liquids such as pesticides, fertilizers, and herbicides.

Yet another object of the present invention is to provide a new garden sprayer which includes a housing defining a reservoir therein for holding fluid therein. The housing also has a lower compartment beneath the reservoir of the housing. A tubular flexible elongate conduit is outwardly extended from the housing. A pump is disposed in the lower compartment of the housing and is in fluid communication with the reservoir of the housing and the elongate conduit. The pump pumps fluid from the reservoir to the elongate conduit when actuated. A spray nozzle is coupled to a free outer end of the elongate conduit. The spray nozzle has a trigger pivotally coupled thereto. The trigger has a switch for selectively actuating the pump.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new garden sprayer according to the present invention.

FIG. 2 is a schematic partial cross sectional view of the housing taken from line 2—2 of FIG. 1.

FIG. 3 is a schematic enlarged breakaway perspective view of the elongate conduit of the present invention.

FIG. 4 is a schematic exploded perspective view of an embodiment of the present invention with a bottom panel.

FIG. 5 is a schematic cross sectional view of the spray nozzle.

DESCRIPTION OF THE PREFERRED EMBODIMENT

With reference now to the drawings, and in particular to FIGS. 1 through 5 thereof, a new garden sprayer embodying the principles and concepts of the present invention and generally designated by the reference numeral 10 will be described.

As best illustrated in FIGS. 1 through 5, the garden sprayer 10 generally comprises a housing defining a reservoir therein for holding fluid therein. The housing also has a lower compartment beneath the reservoir of the housing. A tubular flexible elongate conduit is outwardly extended from the housing. A pump is disposed in the lower compartment of the housing and is in fluid communication with the reservoir of the housing and the elongate conduit. The pump pumps fluid from the reservoir to the elongate conduit when actuated. A spray nozzle is coupled to a free outer end of the elongate conduit. The spray nozzle has a trigger pivotally coupled thereto. The trigger has a switch for selectively actuating the pump.

In closer detail, the garden sprayer 10 is designed for spraying liquids therefrom and includes a housing 11 having a top 12, a bottom 13, and a perimeter side wall 14 extending between the top and bottom of the housing. In one embodiment, the housing may be generally cylindrical in shape so that the bottom of the housing is generally circular in shape and the perimeter side wall of the housing is generally cylindrical in shape. The top of the housing may be circular or even generally conical in shape.

The housing defines a reservoir 15 therein for holding fluid therein. The top of the housing may have a top opening into the reservoir of the housing with a cap 16 removably closing the top opening of the top of the housing.

Optionally, the housing may comprise a translucent material such as a translucent plastic material to permit viewing of the amount of liquid in the reservoir. In such an embodiment, the perimeter side wall of the housing may have calibrated indicia 17 displayed thereon for indicating the amount of liquid in the reservoir of the housing, such as, for example, by volume in gallons.

The housing may have a pair of ground engaging wheels 18 rotatably mounted to the bottom of the housing. In such an embodiment, the housing may also have a push handle 19 coupled to the perimeter side wall of the housing and upwardly extending from the top of the top of the housing. The push handle may be positioned above the wheels of the housing. In one embodiment, the push handle may have a resiliently deformable handgrip 20 for grasping by a user.

As shown in FIG. 2, the housing has a lower compartment 21 adjacent the bottom of the housing and beneath the reservoir of the housing. The housing has a dividing wall 22 separating the lower compartment of the housing from the reservoir of the housing.

A tubular flexible elongate conduit 23 is outwardly extended from the housing adjacent the bottom of the housing. With reference to FIG. 3, the elongate conduit may comprise a flexible inner tube 24 disposed inside a flexible outer tube 25. The outer tube may also comprise a resiliently deformable flexible material such as a rubber material. In an illustrative embodiment, the elongate conduit may have a length between about 6 feet and about 8 feet for providing a convenient length for reaching areas a convenient distance around the housing so that a user does not have to frequently move the housing to water adjacent plots or regions of a garden.

The housing may also have a hanger 26 for coiling the elongate conduit therearound. The hanger of the housing may be outwardly extended from the perimeter side wall of the housing and positioned towards the top of the housing. In such an embodiment, the hanger may even be extended in a plane substantially perpendicular to a plane in which the handgrip of the push handle lies to help ensure that the coiled conduit does not interfere with use of the push handle and vice versa.

A pump 27 is disposed in the lower compartment of the housing. The pump has a motor 28 for actuating the pump. The bottom of the housing may have a mounting extent 29 into which the motor is inserted to mount the motor to the housing in the lower compartment.

A battery 30 may also be disposed in the lower compartment of the housing. In such an embodiment, the battery is electrically connected to the motor and pump for actuating the motor and pump. In such an embodiment, the housing may include an electrical socket 31 electrically connected to the battery for permitting electrical connect of the battery to a power supply via an elongate electrical power cord 32 to recharge the battery.

As illustrated in FIG. 4, in one embodiment, the bottom of the housing may comprise a removable bottom panel 33 that is detachably attached to the housing by a plurality of fasteners 34. When removed, the bottom panel exposes a bottom opening in the housing into the lower compartment providing access to the battery, pump, and motor for easy servicing, repair and replacement.

The pump is in fluid communication with the reservoir of the housing and the elongate conduit. In use, when actuated, the pump pumps fluid from the reservoir to the elongate conduit such that fluid is forced out of a free outer end of the elongate conduit.

The pump has an intake for drawing fluid into the pump extending into the reservoir housing from the dividing wall of the housing. The intake may have a filter 35 such as a screen filter for preventing objects greater than a certain size passing into the intake. In one embodiment, the dividing wall of the housing may even have a downwards taper forming a lower vertex at the intake of the pump so that as much of the fluid in the reservoir as possible can be drained into the pump.

A rigid spray nozzle 36 is coupled to a free outer end of the elongate conduit with an elastic annular clamp 37, the spray nozzle has an open tip for permitting the spray of fluid therefrom.

The spray nozzle has a trigger 38 pivotally coupled thereto adjacent a handle portion 39 of the spray nozzle designed for gripping by a hand of a user. In an embodiment of the garden sprayer, a spring 40 may bias the trigger to pivot away from the spray nozzle.

The trigger has a switch 41 electrically connected to the motor (and thus the pump) for selectively activating the motor to actuate the pump. In one embodiment, the switch may electrically connected to the motor via a pair of elongate wires 42,43 extending along the elongate conduit between the inner and outer tubes of the elongate conduit.

The switch comprises opposing first and second contacts 44,45. The first contact is mounted to the trigger. The second contact is mounted to the spray nozzle so that the first and second contacts face each other. In use, the contacts of the switch complete a circuit between the switch and the motor when the contacts of the switch are in contact with one another when the trigger is pivoted towards the spray nozzle. Conversely, the contacts of the switch break a circuit between the switch and the motor when the contacts of the switch are in spaced apart from one another when the trigger is pivoted away from the spray nozzle.

When actuated, the pump draws fluid from the reservoir and pumps it through the elongate conduit and out the open tip of the spray nozzle to permit a user to spray the fluid on a garden.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A garden sprayer for spraying liquids therefrom, comprising:

a housing defining a reservoir therein for holding fluid therein;

said housing having a lower compartment beneath said reservoir of said housing;

said housing having a dividing wall separating said lower compartment of said housing from said reservoir of said housing;

a tubular flexible elongate conduit being outwardly extended from said housing;

a pump being disposed in said lower compartment of said housing, said pump being in fluid communication with said reservoir of said housing and said elongate conduit, said pump being for pumping fluid from said reservoir to said elongate conduit;

said pump having an intake extending into said reservoir of said housing from said dividing wall of said housing for preventing non-soluble debris from being taken into said pump when said pump is pumping fluid; and a spray nozzle being coupled to a free outer end of said elongate conduit, said spray nozzle having a trigger pivotally coupled thereto, said trigger having a switch for selectively actuating said pump.

2. The garden sprayer of claim 1, wherein said housing is generally cylindrical in shape.

3. The garden sprayer of claim 2, wherein said housing has a generally conical top.

4. The garden sprayer of claim 1, said housing has a pair of ground engaging wheels rotatably mounted to said housing.

5. The garden sprayer of claim 4, wherein said housing having a push handle upwardly extending therefrom, said push handle being positioned above said wheels of said housing.

6. The garden sprayer of claim 1, wherein said elongate conduit comprises a flexible inner tube disposed inside a flexible outer tube.

7. The garden sprayer of claim 1, wherein said housing has a hanger outwardly extending therefrom for coiling said elongate conduit therearound.

8. The garden sprayer of claim 1, wherein a spring biases said trigger away from said spray nozzle.

9. The garden sprayer of claim 8, wherein said switch comprises opposing first and second contacts, said first contact being mounted to said trigger, said second contact being mounted to said spray nozzle, said first and second contacts facing each other.

10. A garden sprayer for spraying liquids therefrom, comprising:

a housing having a top, a bottom, and a perimeter side wall extending between said top and bottom of said housing;

said housing being generally cylindrical in shape, said bottom of said housing being generally circular in shape, said perimeter side wall of said housing being generally cylindrical in shape;

said top of said housing being generally conical in shape;

said housing defining a reservoir therein for holding fluid therein;

said top of said housing having a top opening into said reservoir of said housing and a cap removably closing said top opening of said top of said housing;

said housing having a pair of ground engaging wheels rotatably mounted to said bottom of said housing;

said housing having a push handle coupled to said perimeter side wall of said housing and upwardly extending from said top of said housing;

said push handle being positioned above said wheels of said housing;

said housing having a lower compartment adjacent said bottom of said housing and beneath said reservoir of said housing;

said housing having a dividing wall separating said lower compartment of said housing from said reservoir of said housing;

a tubular flexible elongate conduit being outwardly extended from said housing adjacent said bottom of said housing;

said elongate conduit comprising a flexible inner tube disposed inside a flexible outer tube;

said housing having a hanger for coiling said elongate conduit therearound, said hanger of said housing being outwardly extended from said perimeter side wall of said housing and positioned towards said top of said housing;

a pump being disposed in said lower compartment of said housing;

said pump being in fluid communication with said reservoir of said housing and said elongate conduit, said pump being for pumping fluid from said reservoir to said elongate conduit;

said pump having an intake extending into said reservoir of said housing from said dividing wall of said housing;

a spray nozzle being coupled to a free outer end of said elongate conduit, said spray nozzle having an open tip for permitting the spray of fluid therefrom;

said spray nozzle having a trigger pivotally coupled thereto;

a spring biasing said trigger away from said spray nozzle;

said trigger having a switch electrically connected to said motor;

said switch comprising opposing first and second contacts; and said first contact being mounted to said trigger, said second contact being mounted to said spray nozzle, said first and second contacts facing each other.

* * * * *